(12) United States Patent
Xiao et al.

(10) Patent No.: US 12,461,785 B2
(45) Date of Patent: Nov. 4, 2025

(54) GRAPHIC-BLOCKCHAIN-ORIENTATED SHARDING STORAGE APPARATUS AND METHOD THEREOF

(71) Applicant: Huazhong University of Science and Technology, Wuhan (CN)

(72) Inventors: Jiang Xiao, Wuhan (CN); Feng Cheng, Wuhan (CN); Junpei Ni, Wuhan (CN); Wenhui Yang, Wuhan (CN); Hai Jin, Wuhan (CN)

(73) Assignee: HUAZHONG UNIVERSITY OF SCIENCE AND TECHNOLOGY, Wuhan (CN)

( * ) Notice: Subject to any disclaimer, the term of this patent is extended or adjusted under 35 U.S.C. 154(b) by 722 days.

(21) Appl. No.: 17/806,614

(22) Filed: Jun. 13, 2022

(65) Prior Publication Data

US 2023/0009961 A1 Jan. 12, 2023

(30) Foreign Application Priority Data

Jul. 12, 2021 (CN) .......................... 202110787586.0

(51) Int. Cl.
*G06F 9/50* (2006.01)
*H04L 9/00* (2022.01)
*H04L 9/06* (2006.01)

(52) U.S. Cl.
CPC .......... *G06F 9/5044* (2013.01); *G06F 9/5061* (2013.01); *H04L 9/0643* (2013.01); *H04L 9/50* (2022.05); *G06F 2209/505* (2013.01)

(58) Field of Classification Search
CPC ................. G06F 9/5044; G06F 9/5061; G06F 2209/505; G06F 16/27; H04L 9/0643; H04L 9/50; G06Q 20/382
See application file for complete search history.

(56) References Cited

U.S. PATENT DOCUMENTS

2020/0097953 A1* 3/2020 Islam ................. G06Q 20/0658
2021/0406872 A1* 12/2021 Thai .......................... H04L 9/50

FOREIGN PATENT DOCUMENTS

| CN | 111901350 | | 11/2020 | |
| CN | 113553375 | | 10/2021 | |
| KR | 20200059136 A | * | 5/2020 | ........... G06Q 20/065 |

OTHER PUBLICATIONS

Qin et al. A Secure and Effective Construction Scheme for Blockchain Networks, Dec. 10, 2020, <https://onlinelibrary.wiley.com/doi/epdf/10.1155/2020/8881881>, pp. 1-20 (Year: 2020).*

(Continued)

*Primary Examiner* — April Y Blair
*Assistant Examiner* — Hsing Chun Lin
(74) *Attorney, Agent, or Firm* — Michael Ye; Kalos Athena Wang PLLC

(57) ABSTRACT

The present invention relates to a graphic-blockchain-orientated sharding storage apparatus, at least comprising a first sharding module and a second sharding module, wherein the first sharding module shards nodes having different resource capacity levels based on ledger data organized using a DAG structure, and the second sharding module assigns transactions to the shards matching with execution difficulty levels of the transactions, so that each said transaction is processed and stored in the shard corresponding thereto. The present invention incorporates the sharding technology into a graphic blockchain to provide a graphic-blockchain-orientated sharding storage method, so as to reduce pressure in terms of data storage and transaction processing on nodes of the graphic blockchain system. In addition, nodes, transactions, and data are dynamically divided according to resource heterogeneity among nodes, so as to further enhance performance of the graphic blockchain system while achieving efficient use of resources.

7 Claims, 3 Drawing Sheets

(56) References Cited

OTHER PUBLICATIONS

Hong et al. Pyramid: A Layered Sharding Blockchain System, May 10-13, 2021, <https://ieeexplore.ieee.org/abstract/document/9488747>, pp. 1-10 (Year: 2021).*

Dang et al. Towards Scaling Blockchain Systems via Sharding, Jun. 30-Jul. 5, 2019, <https://dl.acm.org/doi/pdf/10.1145/3299869.3319889>, pp. 1-18 (Year: 2019).*

Hellani et al. Computing Resource Allocation Scheme for DAG-Based IOTA Nodes, Jul. 9, 2021, <https://www.mdpi.com/1424-8220/21/14/4703>, pp. 1-18 (Year: 2021).*

Cachin et al. The Transaction Graph for Modeling Blockchain Semantics, Dec. 2, 2020, <https://cryptoeconomicsystems.pubpub.org/pub/cachin-blockchain-semantics/release/9>, pp. 1-35 (Year: 2020).*

Park et al., KR20200059136A Description Translation, May 28, 2020, <https://worldwide.espacenet.com/publicationDetails/description?CC=KR&NR=20200059136A&KC=A&FT=D&ND=3&date=20200528&DB=&locale=en_EP>, pp. 1-9 (Year: 2020).*

\* cited by examiner

GRAPHIC-BLOCKCHAIN-ORIENTATED SHARDING STORAGE APPARATUS AND METHOD THEREOF

This application claims the benefit of the Chinese Patent Application No. 202110787586.0 filed on Jul. 12, 2021, which is hereby incorporated by reference as if fully set forth herein.

BACKGROUND OF THE INVENTION

1. Technical Field

The present invention relates to the technical field of blockchains, and more particularly to a graphic-blockchain-oriented sharding storage apparatus and method thereof.

2. Description of Related Art

With the development of the IoT (Internet of Things) technology, more and more IoT devices have been introduced into our life. Information collected using these IoT devices has a great value in terms of analysis and use. For example, it can be used in applications like smart home, automated production lines, and more. However, since the traditional IoT models use a centralized data hub to collect information from connected devices, they are becoming incompetent in the increasingly growing IoT ecosystem, and can bring about concerns about data security and privacy. The blockchain technology therefore has received extensive attention in academic and industrial communities for is features like decentralization, incorruptibility, transparency, and anonymity. Blockchains provide a new trusted model in an open network, and enables data storage services with security and privacy protection in a distributed, non-trusted environment. This provides a solution for trusted data management in an IoT. However, the traditional link-type blockchains lack for scalability in terms of throughput and storage performance. This is primarily because its security depends highly on the high-redundancy distributed ledger of a blockchain. In other words, every node has to process every transaction, and nodes have to reach consensus on a block composed of a batch of transactions and store complete transaction history. In addition, the traditional blockchain technology uses the Proof of Work (PoW) mechanism as the consensus strategy. Such a strategy can consume considerable resources, and thus is not suitable for IoT devices with limited resources. Therefore, how to use the blockchain technology to provide IoT devices with scalable data storage services has become an issue to be addressed.

A scheme based on a directed acyclic graph (DAG) has been proposed as approach to improving link-type blockchains in terms of scalability. Specifically, a DAG-based graphic blockchain improves the traditional link-type blockchain system from the data layer and from the consensus layer by organizing ledger data into a DAG-based structure. Opposite to the traditional link-type blockchain wherein blocks can be only added to the ledger serially, a DAG ledger allows multiple reference edges to coexist in its storage unit, which means that multiple nodes can independently and concurrently write transactions or blocks into the ledger. This frees the blockchain from the restriction of serial writing, and thereby can significantly improve system throughput with given node resources. An IoTA is an outstanding scheme that applies the graphic blockchain technology to the IoT industry. An IoTA is based on a novel, distributed ledger tangle. A tangle is a directed acyclic graph directly formed by transactions, and also known as a transaction-based DAG (TDAG). It breaks the efficiency bottleneck of the traditional blockchain systems. An IoTA has advantages in terms of realtimeness, scalability, and transaction costs, and prevents heavy and useless computing works required by block packeting and mining. As the resource requirements are relatively low, it is particularly suitable for IoT scenarios.

While graphic blockchains, such as IoTA, provides a new data storage scheme to the IoT, and can achieve higher throughput and better scalability than the traditional link-type blockchains, every node in the network still has to process every transaction and store the entire DAG ledger. This makes the existing graphic blockchain designs less effective in making improvements in application scenarios where nodes in a network have uneven and limited resource capacity levels, particularly in the following aspects:

1) Highly concurrent scenarios demand more from blockchain nodes for storage, computing and communication, and stress nodes with limited resource capacity levels in terms of storage and processing. Specifically, full copy storage is no more a solution as storage requirements increase with rapid growth of data volume. Although use of a DAG-based ledger helps improve throughput of the resulting system, it further aggravates storage consumption. Most IoT devices are limited in storage resources, and unable to bear such huge store overheads. Additionally, since nodes have to process all transactions, high throughput even sharpens processing burdens on nodes. The upper limit of the processing capacity of a node prevents further improvement in system performance.

2) It is common that resources in a blockchain system are distributed unevenly across nodes, and this is reflected in differences among nodes or devices in processing capacity, bandwidth, and storage, leading to significantly reduced resources usage throughout the blockchain network and adversely affecting overall efficiency of the system.

3) The huge resource overheads can deter users from participating in the system, and are unfavorable to decentralization and security of the system.

In recent years, for increasing scalability of blockchains, shard-based blockchain solutions have received increasing attentions and researches in academic and industrial communities. A shard-based system improves the traditional blockchain systems in terms of system structure and consensus layer. Such a scheme is about dividing a network into more and smaller groups, each called a shard, and dividing transactions that have not been processed into several groups that are then orientated to corresponding shards for processing. Therefore, all the shards can process transactions in parallel, thereby linearly boosting system throughput. In order to further enhance storage scalability, the whole ledger data are assigned into multiple shards. Nodes in every shard only store ledger data related to this shard. Such a strategy is called state sharding. Since nodes reach consensus in the relatively small shard, this scheme helps reduce overheads for communication, computing and storage with respect to individual nodes, thereby significantly increasing throughput.

However, the existing shard-based blockchain systems, such as Elastico, OmniLedger, RapidChain, and Monoxide, are typically of a link-type structure that stores data in units of blocks. By contrast, sharding strategies designed for TDAG-based ledger structures are sparse. Meanwhile, the works known in the art are all based on a static model wherein nodes have homogeneous resources. In other words, they assume that nodes have roughly similar resources and the resulting shards are homogeneous. The assumption is nevertheless not the case in real-world application scenarios. For example, China Patent Publication No. CN111901350A has disclosed a blockchain system, a data processing method, a computer device, and a storage medium. The system comprises: a consensus layer, for synchronizing transaction information in individual nodes using the PoA protocol, wherein the transaction information is used to generate blocks; a data layer, for using the blocks generated by the nodes to construct a directed acyclic graph structure, and compressing data stored in the blocks; a network layer, for controlling communication among the blocks using an aggregative manner; and a contract layer, for controlling data interaction among the blocks by means of the side-link protocol and a sharding strategy. Therein, the sharding strategy is about dividing a full blockchain into multiple shards, wherein each of the shards can validate transactions independently, so as to increase on-chain throughput. The blocks in the blockchain are segmented according to the sharding strategy. Every segment is independent of the other segments, and every segment independently validates communication information therein.

In view of the aforementioned concerns, there is a pressing need for a graphic-blockchain-orientated dynamic sharding strategy that can help nodes reduce burdens in terms of transaction processing and data storage, while dynamically dividing nodes, transactions, and data according to resource heterogeneity, thereby achieving "tailored" resources allocation, improving overall efficiency of the system, and in turn being adaptative to dynamic and heterogeneous IoT scenarios.

Further, since there is certainly discrepancy between the prior art comprehended by the applicant of this patent application and that known by the patent examiners and since there are many details and disclosures disclosed in literatures and patent documents that have been referred by the applicant during creation of the present invention not exhaustively recited here, it is to be noted that the present invention shall actually include technical features of all of these prior-art works, and the applicant reserves the right to supplement the application with technical features known in the art as support.

SUMMARY OF THE INVENTION

The problem of the prior art is that in IoT application scenarios, node storage and processing burden on nodes of a graphic blockchain is heavy and heterogeneity of node resources is not properly considered. In view of this, the present invention incorporates the sharding technology into a graphic blockchain to provide a graphic-blockchain-orientated sharding storage apparatus and method thereof, so as to reduce pressure in terms of data storage and transaction processing on nodes of the graphic blockchain system. In addition, nodes, transactions, and data are dynamically divided according to resource heterogeneity among nodes, so as to further enhance performance of the graphic blockchain system while achieving efficient use of resources.

The disclosure provides a graphic-blockchain-oriented sharding storage apparatus, at least comprising a first sharding module and a second sharding module, wherein the first sharding module shards nodes having different resource capacity levels based on ledger data organized using a DAG structure, and the second sharding module assigns transactions to the shards matching with execution difficulty levels of the transactions, so that each said transaction is processed and stored in the shard corresponding thereto.

According to a preferred mode, the first sharding module rates the resource capacity levels of the nodes to get rating results, and each of the nodes solves a Hash puzzle through a Proof of Work (PoW) mechanism so as to obtain a PoW result.

According to a preferred mode, each of the nodes broadcasts its rating result and PoW result, so as to discover members and establish the shards.

The disclosure further provides a graphic-blockchain-orientated sharding storage method, at least comprising: sharding nodes having different resource capacity levels on basis of ledger data organized using a DAG structure, and assigning transactions to the shards matching with execution difficulty levels of the transactions, so that each said transaction is processed and stored in the shard corresponding thereto. The method comprises using a DAG structure to organize the ledger data. The method comprises sharding nodes having different resource capacity levels. The method comprises assigning transactions to the shards matching with execution difficulty levels of the transactions. The method comprises processing and storing each said transaction in the shard corresponding thereto.

According to a preferred mode, each of the transactions when added into the DAG ledger has to randomly select two Tip transactions for validation, wherein the Tip transaction is a transaction that is at a tail of the ledger and has not been validated.

According to a preferred mode, in the DAG ledger, an accumulated confirmation value of the transaction is used to represent number of transactions that directly or indirectly validated the transaction, and when the accumulated confirmation value reaches a preset threshold, it is determined that the transaction is in a confirmed state.

The present invention uses a TDAG-based ledger structure. Opposite to a link-type structure wherein ledger data are organized with a single reference edge, the TDAG-based ledger structure allows every storage unit to have plural reference edges. In other words, every storage unit can validate plural storage units. In a DAG ledger, every storage unit represents a single transaction, but not a block that containing plural transactions. This arrangement helps reducing time required by packeting transactions, so as to make full use of network resources. Since there is no need to packet blocks, the work of validating transactions is shared by all users participating in the system. When a user initiates a transaction, it has to randomly select and validate two transactions existing in the ledger. Preferably, when a user initiates a transaction, the user selects transactions that have not been validated for validation. The accumulated confirmation value of a transaction is the number of transactions that have directly or indirectly validated the transaction, and represents how much the transaction is accepted by the network. When the accumulated confirmation value reaches a preset threshold, the transaction is regarded as in the confirmed state.

According to a preferred mode, the step of node sharding at least comprises: rating the resource capacity levels of the nodes to get rating results; having each of the nodes solve a Hash puzzle through a Proof of Work (PoW) mechanism so as to obtain a PoW result; and sharding the nodes according to the rating result and the PoW result.

According to a preferred mode, the rating result and the lowest bits in the PoW result are stitched together to form the shard number of the corresponding node.

According to a preferred mode, each of the nodes broadcasts its rating result and PoW result, so as to discover members and establish the shards.

The present invention implements sharding on the basis of a TDAG as described above. First, the sharding strategy for network nodes is to be determined. Different nodes in a network can have different resources, and thus different processing capacity levels, storage capacity levels, and bandwidths. According to the traditional sharding strategy, nodes are regarded as homogeneous individuals and are assigned to shards of the same scale by simply adopting the PoW mechanism or random numbers. This can bring about the buckets effect, which means that consensus in every shard is limited by the weakest node. Therefore, a good dynamic sharding strategy shall pay proper attention to resource heterogeneity among nodes. Accordingly, in the present invention, shards are planned with full consideration to the resource capacity of every node. In particular, nodes are rated into different ratings, so that nodes in the same shard have the same resource assessment rating, and form "strong alliance" and "weak alliance", thereby ensuring that nodes in the same shard have approximately same processing and storage capacity levels, so as to ensure that consensus can be reached smoothly in a shard.

According to a preferred mode, the step of node sharding at least comprises: rating the resource capacity levels of the nodes to get rating results; and having each of the nodes solve a Hash puzzle through a Proof of Work (PoW) mechanism so as to obtain a PoW result. The step of node sharding further comprises: sharding the transactions according to the rating result and Hash value of the transactions.

According to a preferred mode, each of the shards only stores a part of the DAG ledger, and each of the nodes only stores a copy of the DAG ledge corresponding to the shard where the node is located.

According to a preferred mode, a transaction newly added to the DAG ledger is only broadcasted in the shard corresponding thereto, and is stored by the nodes in the shard.

After the sharding process, there are several shards having different overall processing capacity levels. For making full use of resource capacity levels of nodes, the present invention discards the traditional strategy that evenly divides transactions, but instead shards transactions with full consideration to heterogeneity among transactions. In the present invention, heterogeneity among transactions refers to differences among transactions in required execution resources and in required storage sizes. Herein, heterogeneity among transactions is expressed as quantified execution difficulty of transactions. Accordingly, a shard composed of strong nodes can be assigned with more transactions that are more difficult to execute, and a shard composed of weak nodes can be assigned with fewer transactions that are easier to execute, thereby making every shard have the processing capacity matching its working difficulty for processing transactions.

In order to reduce storage pressure on nodes, the present invention divides the whole DAG ledger into several parts, each stored in a corresponding shard. Thereby, every node only needs to store transaction data in the shard where it is located. A newly added transaction is only broadcasted in the corresponding shard, and is stored by corresponding nodes. Since the nodes having similar resource capacity levels are placed in the same shard during the sharding process, the DAG ledger in a shard can be efficiently synchronized among the nodes in the shard, thereby ensuring consistency of the distributed ledgers. In this way, nodes having limited storage resources are allowed to maximally participate in consensus formation and data storage in their respective shards. Preferably, data storage at individual nodes may be further optimized using the historical data pruning technology. In some particular use scenarios, transaction data that are deep in the DAG ledger and have been confirmed may be deleted securely by means of forming a checkpoint, so as to further reduce storage burden on nodes.

According to a preferred mode, the graphic-blockchain-orientated sharding storage method of the present invention further comprises designing the entire sharding process. In the present invention, there may be a method F1 for assessing resource capacity levels of nodes. The method F1 may provide every node with secure and validatable assessment level of the resource capacity. In the present invention, there may be a method F2 for comprehensively estimating how much resource is required by execution and storage of a transaction.

The system runs in rounds. In every round, first, every node calls the method F1 to acquire its resource capacity rating. The nodes having similar resource capacity levels will be given the same rating. In an open environment, identity information of every node has to be effectively established to resist sybil attacks. To build the identity information, every node solves a Hash puzzle using the PoW mechanism. The PoW result can be a validatable Hash value which combines with the resource capacity rating of a node so as to collectively determine to which shard the node should be located. Under this configuration, all nodes are assigned to respective shards according to certain randomness and heterogeneity of their resource capacity levels, and thereby discovering shade members and establishing shards.

According to a preferred mode, the sharding storage method further comprises: reconstructing the shards, so that all of the nodes are re-sharded, to open a new round of the consensus process.

After the shards are established, peers can start to process transactions. A transaction submitted by a user may be rated using the method F2 and have a corresponding execution difficulty rating. On the principle that shards having stronger processing capacity levels process transactions that are more difficult, according to its execution difficulty rating and Hash value, every transaction is routed to a designated shard where it is processed, and then added into the DAG ledger of the shard. Additionally, for defending against attacks of adaptive node, and optimistically dealing with entrance/exit of nodes and varying node resource capacity levels in dynamic environments, the shards are reconstructed at the end of every round.

The present invention further provides a graphic-blockchain-orientated sharding storage system, which comprises a computer device, wherein the computer device is programmed or configured to execute the steps of the disclosed graphic-blockchain-orientated sharding storage method, or the computer device has its storage medium storing a computer program that is programmed or configured to execute the graphic-blockchain-orientated sharding storage method of the present invention, or the computer readable storage medium stores therein a computer program that is programmed or configured to execute the disclosed graphic-blockchain-orientated sharding storage method.

The present invention further provides an electronic device for storing data, which comprises: a storage device and a processor. The processor and the storage device communicate with each other through a bus. The storage device stores therein program instructions that can be executed by the processor. The processor calls the program instructions to execute the graphic-blockchain-orientated sharding storage method of the present invention.

By implementing the graphic-blockchain-orientated sharding storage method of the present invention and applying the dynamic sharding strategy to a graphic blockchain, at least one of the following beneficial effects can be achieved: processing and soring burden on nodes can be reduced; with full consideration to resource heterogeneity among nodes, strong nodes with adequate resources and lightweight nodes with limited resources can both be engaged, thereby endowing the system with better accommodation to heterogeneous devices; resources in the blockchain network can be better used; and system performance can be improved.

DETAILED DESCRIPTION OF THE INVENTION

Figure 1:
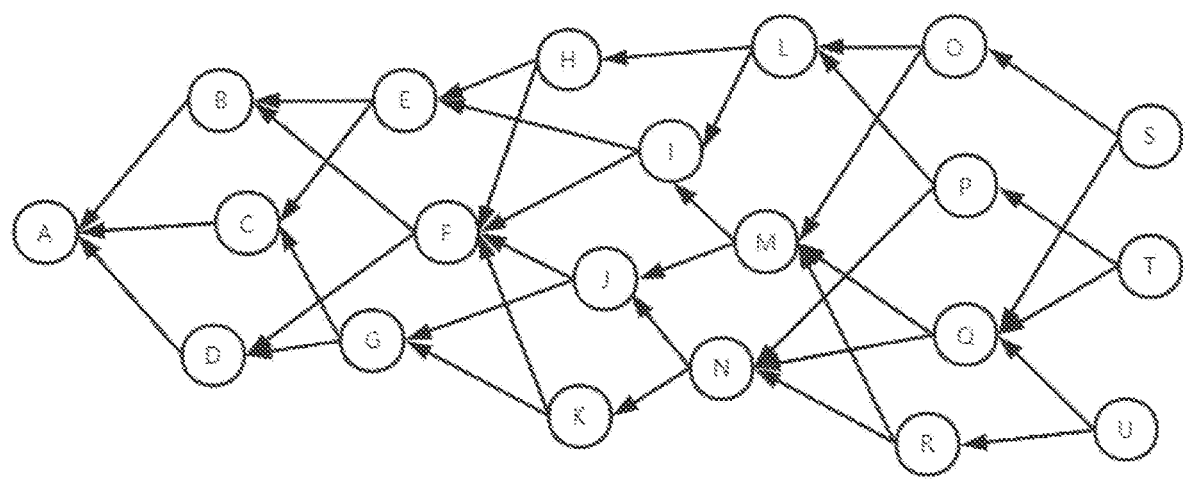
FIG. 1 is a schematic drawing illustrating a ledger data structure according to the present invention.

The following description will be made with reference to the accompanying drawings and some embodiments to further explain implementations of the present invention in detail. It is obvious that these embodiments are merely some but not all examples of the present invention. Based on the embodiments of the present invention, all the other embodiments can be conceived without creative labor by people of ordinary skill in the art, and all these and other embodiments shall be encompassed in the scope of the present invention.

For facilitating understanding, technical terms used in the disclosure are defined below.

A DAG is a directed acyclic graph, and is mathematically defined as a finite directed graph that does not have any directed loop. It is composed of a finite number of apexes and directed edges. Every directed edge is pointed at an apex from another apex. A travel started from any apex through these directed edges will never go back to the departure apex. In the field of computer science, a directed acyclic graph is a data structure, or a way how data are organized.

A graphic blockchain mainly refers to a DAG-based blockchain, also known as a DAG ledger. It uses a DAG data structure to organize and store ledger data. Every apex in a DAG ledger represents a storage unit, which may be a single transaction, or a block composed of multiple transactions happening in a period of time. A normal single-chain blockchain is a special case of a DAG ledger, which means that, in every period of time, the whole system can only generate one block. What is different is, a DAG ledger allows different nodes to create storage units at their own paces, as long as every storage unit selects one or more units as its sub-units. A DAG ledger has obvious advantages over the traditional link-type blockchains, mainly in terms of scalability and transaction throughput. By organizing a ledger using the DAG data structure, a node can process new transactions without having data consistency of all nodes. This prevents time waste caused by network latency and data synchronization. Therefore, the number of nodes participating in DAG accounting can significantly increase. Additionally, the DAG ledger may be tailed with any amount of new data in a parallel manner, so it naturally has high concurrency to provide excellent transaction throughput. This makes it beat link-type blockchains. A link-type blockchain only allows data per one block to be added, so its transaction throughput is limited and hard to be significantly improved.

A TDAG is a transaction-based directed acyclic graph, or a DAG ledger based on transactions, wherein the ledger stores data in units of individual transactions.

Sybil attacks represent a form of attacks targeting peer-to-peer (P2P) networks. An attacker uses one node to forge multiple identities in a P2P network, so as to weaken redundancy of the network, degrade robustness of the network, or to monitor or interfere with normal operations in the network. In a P2P network, for addressing security threats coming from malicious nodes or caused by node failure, a common practice is to introduce a redundant backup mechanism, by which operation or storage tasks are copies to multiple nodes, or a complete task is divided and stored in multiple nodes. Normally, a device entity represents a node, and a node is identified by an ID. However, in a P2P network lacking for a trusted node identification agency, it is difficult to ensure that the nodes involved are different entities. An attacker may deploy only one entity but broadcast IDs of multiple identities to the network to pretend different nodes. These forged identities are usually known as sybil nodes. Sybil nodes secure more network control for the attacker. Once a user performs a query on resources by way of these sybil nodes, the attacker can interfere with the query and return wrong results, or even refuse to reply.

The PoW (Proof of Work) mechanism works as described below. In order to make transaction data recorded on a blockchain and have consensus reached thereon in a certain period of time, the PoW mechanism is to have all network node participants of the blockchain compete for the accounting right. This means that if a node wants to generate a new block and write the block into the blockchain, it has to answer a Hash puzzle by continually trying random numbers, and the node answering first wins the right to do accounting. Then the winning node can start to keep account and broadcasts newly mined block to other nodes for validation. Afterward, the node can start a new round of mining. If transactions in a block are acknowledged by other node participants as valid and the answer to the puzzle is correct, the answer is trusted, so the new block will be written into the local ledger of the validators. At the same time, the validators enter a new round of mining competition.

A bit string is a string of bits. A bit is the minimal data unit in an electronic computer, and the state of a bit is either 0 or 1.

A Tip transaction, as used in the present invention, refers to a transaction that is at a tail of the ledger and has not been validated.

The pruning strategy is for optimization of algorithms, and is usually applied to DFS and BFS search algorithms. The pruning strategy is to search for filters and reduce unnecessary search paths in advance. In optimization of search algorithms, pruning is to avoid some unnecessary traversal process through some judgments. The key to apply pruning optimization is to design a proper method for determining pruning works. This is about determining which branches should be discarded and which branches should be kept. The ledger pruning technology for blockchains is to cut historical data useless to validation of transactions and blocks according to some rules, thereby effectively decreasing the size of the ledger of the whole blockchain.

The present invention is based on a graphic blockchain ledger storing data in units of transactions, and provides a dynamic sharding apparatus and method thereof applicable to a dynamic environment of blockchain with nodes having different resource capacity levels. The sharding storage apparatus of the present invention is preferably, for example, a computer, a server, or any other apparatus or system using the sharding storage apparatus. According to embodiments of the present invention, in addition to the first sharding module and the second sharding module, the sharding storage apparatus may further comprise other components, such as a CPU, a communication unit, and an I/O unit. For conciseness, only the first sharding module and the second sharding module are depicted in the drawing. The first sharding module may comprises a resource rating unit, and the second sharding module may comprise an execution difficulty unit and a transaction dividing unit. Exemplarily, general processors, digital signal processors (DSPs), application specific integrated circuits (ASICs), field programmable gate arrays (FPGAs) or other programmable logic devices, distributed-element gates or transistor logics, distributed-element hardware components or any combination used to execute the functions described herein may be used to realize or execute logic blocks, modules, and circuits incorporating the disclosure. The general processor may be a micro-processor. Alternatively, the processor may be any common processor, controller, micro-controller, or state machine. The processor may alternatively be a combination realized as a computing device, such as a combination of a DSP and a micro-processor, a combination of plural micro-processors, a combination of one or more micro-processors and a DSP kernel, or any similar structure. Exemplarily, the embodiments of the disclosure may be described in the context of machine executable instructions. The machine executable instructions may be included in program modules run in a device in a target real or virtual processor. Generally speaking, the program modules may include routines, programs, libraries, objects, classes, components, data structures, etc., which execute specific tasks or implement particular abstract data structures. In each embodiment, functions of the program module may be combined or divided among the described program modules. Machine-executable instructions for the program modules may be executed locally or in distributed devices. In the distributed devices, the program modules may be located in local and remote storage media.

The dynamic sharding method comprises network node sharding, transaction sharding, and data sharding, so as to provide an IoT-orientated, lightweight, high-performance data storage service platform. While the steps of the disclosed dynamic sharding method are herein described in a specific sequence, this shall not be construed as that the exact operations have to be performed in the described sequence or performed successively to obtain the expected results. In some cases, multi-tasking or parallel processing may be advantageous. Similarly, the detailed implementation included in the discussion given above shall not be interpreted as limitations to the scope of the present invention or of the claims. Instead, they are only description for some particular embodiments of the discussed invention. In the disclosure, some features separately described with respect to the context of different embodiments may be integrally implemented in a single embodiment. On the contrary, features described with respect to the context of a single embodiment may be alternatively implemented in multiple embodiments or any suitable sub-combination of these embodiments separately.

The TDAG-based blockchain ledger structure adopted in the present invention is now explained as following.

In the present invention, the graphic blockchain model is a graphic blockchain system organized by sorting data in the unit of transactions. As shown in FIG. 1, every circle represents a basic storage unit in the DAG ledger. In the present invention, the storage unit is a single transaction. As shown in FIG. 1, edges linking two apexes represent the validation relationship of the two transactions. For example, a directed edge pointed at Transaction C from Transaction E indicates that Transaction E validates Transaction C.

When added into the DAG ledger, every transaction has to randomly select two Tip transactions for validation. Every time of validation generates an edge pointed at the Tip transaction from the new transaction in the DAG ledger.

Since every storage unit stores the Hash value of the validated transaction, a single transaction can directly or indirectly validate all transactions that can be traversed through the transaction.

The newly added transaction will validate more transactions in a larger range by validating transactions that have not been validated.

The accumulated confirmation value of a transaction is used to represent the number of transactions that have directly or indirectly validated this transaction. The accumulated confirmation value of a transaction may be used to learn how much the transaction is accepted by the network. A higher accumulated confirmation value of a transaction means that more transactions have provided validation to this transaction, which indicates that this transaction is truer and more reliable. When the accumulated confirmation value of a transaction reaches a present threshold, the transaction is regarded as in a confirmed state.

For example, as shown in FIG. 1, by incorporating the Hash values of Transaction I and Transaction J in the transaction structure, Transaction M expresses its direct validation relationship with transaction I and transaction J. According to the validation relationship, it can be learned that the transactions that have been directly or indirectly validated by Transaction M are A, B, C, D, E, F, G, I, and J, and the transactions that have directly or indirectly validated Transaction M are: O, P, Q, R, S, T, and U. Therefore, the accumulated confirmation value of Transaction M is 7.

When a node needs to initiate a transaction, the node randomly selects two Tip transactions existing in the DAG ledger. The node confirms that the two transactions are both valid and do not conflict mutually. The node performs the PoW operation to bind the transaction to the validated transactions. At last, the transaction is broadcasted to the network. The proof of work (PoW) mechanism is mainly about guessing a random number through computing, so that the random number after added with transaction data has its Hash value satisfying a preset upper limit.

The following description will be directed to the network node sharding process in the dynamic sharding strategy of the present invention.

When applying a sharding strategy to a graphic blockchain, the inventor of the present invention took full account of resource heterogeneity among nodes, and designed the dynamic sharding strategy correspondingly, so as to divide network nodes into shards.

Currently, most existing network sharding strategies assume that all nodes are homogeneous and have equal computing power, and therefore use PoW results or rely on reliable random sources to assign nodes to corresponding shards. However, such an approach ignores the fact that nodes in real-world application scenarios are heterogenous in terms of resources. In view of this, the network sharding strategy of the present invention includes the resource capacity of a node into consideration when deciding to which shard the node is assigned. Specifically, there is a method F1 for assessing and rating resource capacity levels of nodes in a secure and validatable manner so that nodes having similar resource capacity levels are rated as the same resource capacity rating. In an open environment, identity information of every node has to be effectively established to resist sybil attacks. Every node solves a Hash puzzle using the PoW mechanism. The PoW result and the resource capacity rating of a node collectively determine to which shard the node should be located. Preferably, the lowest bits in the result and the resource capacity rating are stitched together to form the shard number where the node is located. Accordingly, nodes in the same shard have the same resource capacity rating, and have similar processing and storage capacity levels, so as to make full use of the network resources.

Figure 2:
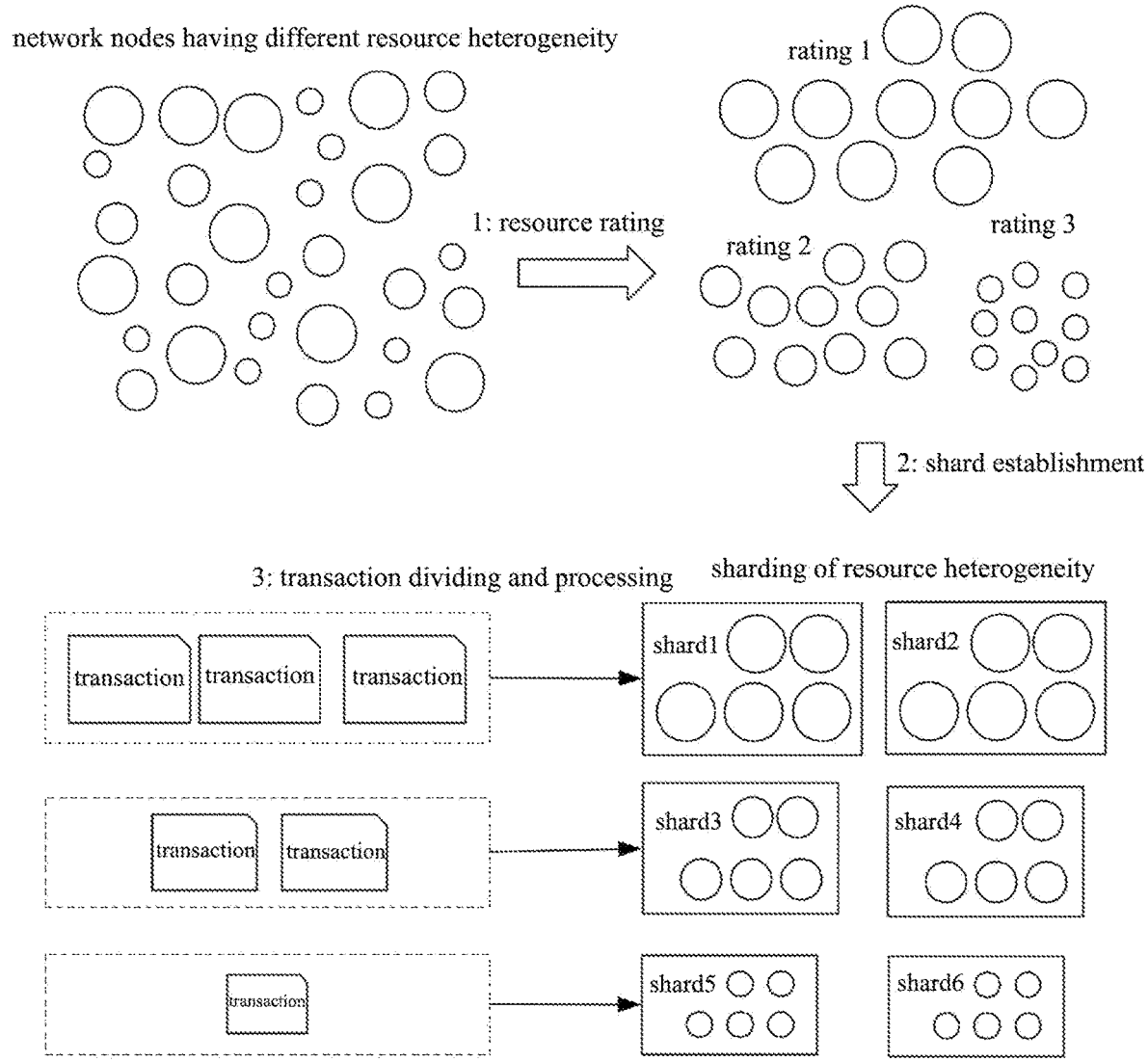
FIG. 2 is an illustration explaining a sharding strategy according to the present invention.

As shown in FIG. 2, circles of different sizes at the left represent network nodes having different resource ratings. The larger circle indicates the higher comprehensive capability the node has. The sharding strategy of the present invention at least comprises Steps 1 and 2.

Step 1 is resource rating. Therein, every node acquires its own resource capacity rating through the method F1. The resource capacity rating is a bit string that can be validated. On this basis, nodes are divided into three levels logically. The nodes having similar levels of resource capacity are rated as the same rating. The logical division of nodes is as shown in FIG. 2, in which circles representing the same rating have similar sizes.

Step 2 is shard establishment. Therein, every node solves a Hash puzzle by means of the PoW mechanism, so as to get a Hash value that can be validated. The combination of the Hash value and the resource capacity rating of a node determines in which shard the node is located. Subsequently, every node broadcasts its own resource capacity rating and PoW Hash value, so as to discover members and establish shards. As shown in FIG. 2, the nodes are divided into 6 shards, and the nodes in each shard are at the same resource capacity rating.

According to the dynamic sharding strategy of the present invention, transactions are sharded as detailed below.

Heterogeneity also exists among transactions, in terms of, for example, required computing amount and required storage space. Based on the principle of matching between capacity and difficulty, after nodes are sharded by resource heterogeneity, transactions with different capacity levels have to be assigned to different shards for processing and sorting.

According to the present invention, there is a method F2 for comprehensively estimating resources required by a transaction for its execution and storage. The transaction data submitted by a user to the system are processing using F2 to generate a corresponding execution difficulty rating. The execution difficulty rating and the Hash value of a transaction can be used to determine to which shard the transaction should belong.

The sharding strategy of the present invention further comprises Step 3, which is about dividing and processing transactions. As shown in FIG. 2, at Step 3, the size of the transaction intuitively reflects its execution difficulty rating. Further with reference to randomness coming with the Hash value, the present invention assigns a larger number of transactions, which are more difficult, to shards having higher resource ratings for processing. Similarly, a smaller number of transactions, which are less difficult, are assigned to shards having lower resource rating for processing. Accordingly, the sharding strategy of the present invention can make sharding capacity levels match difficulty levels of transactions, so as to make full use of network resources.

The following description explains data sharding according to the dynamic sharding strategy of the present invention.

After a transaction is executed in a shard, if the transaction is found to be valid, it will be stored by all nodes in the shard. Therefore, logically, every shard only stores a part of the complete DAG ledger. Every node only stores the copy of the DAG ledger of the corresponding shard. This configuration significantly reduces storage burden on nodes. Since network nodes in the same shard having similar resource capacity levels, there will not be any significant difference among the copies of the DAG ledger stored by the nodes. This ensures data consistency of the distributed ledgers.

The sharding process according to the dynamic sharding strategy of the present invention is detailed as follows.

Figure 3:
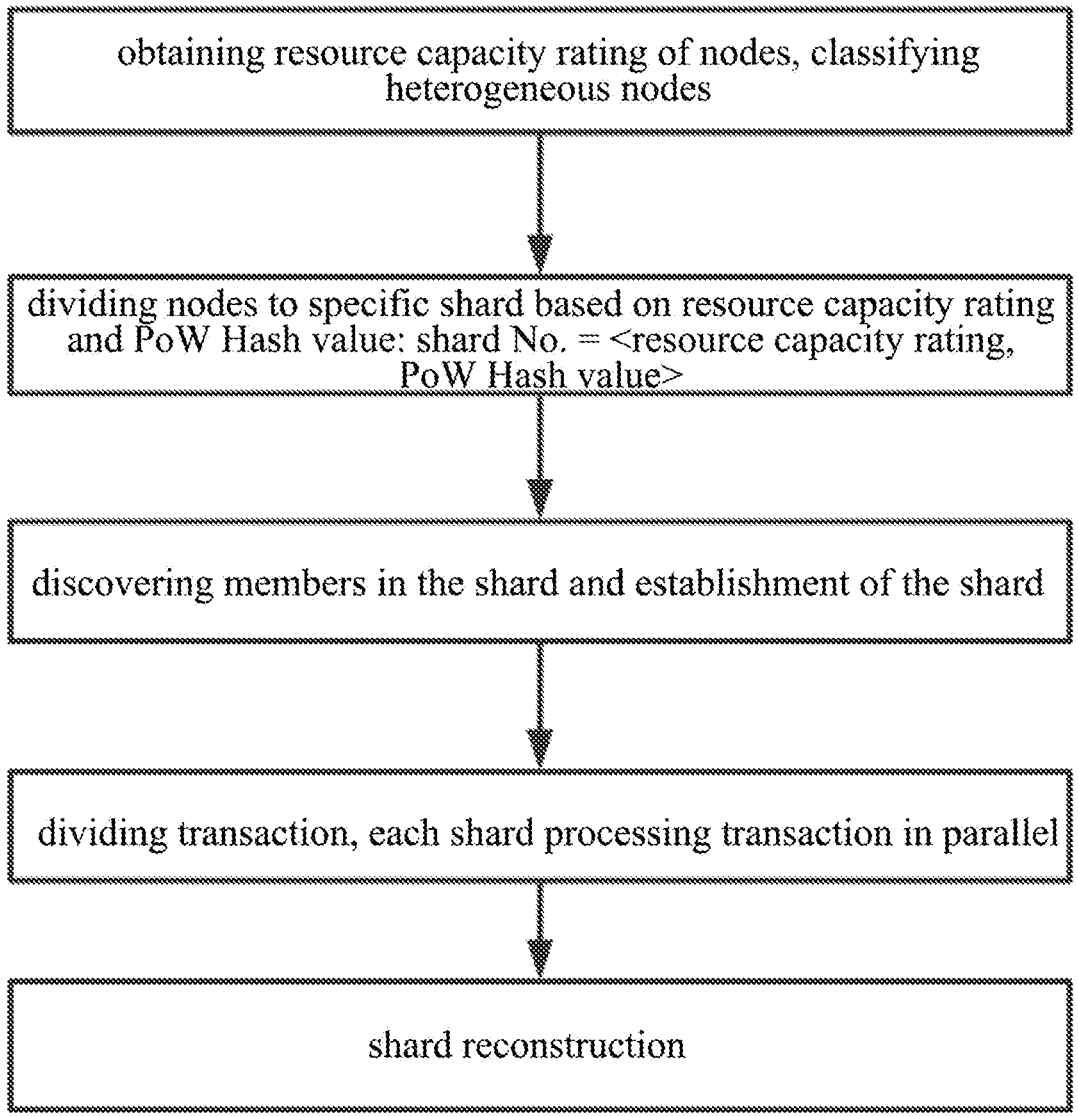
FIG. 3 is a flowchart of a sharding process according to the present invention.

As shown in FIG. 3, the sharding process according to the dynamic sharding strategy of the present invention at least comprises:
  acquiring resource capacity ratings of nodes and classifying heterogeneous nodes;
  for every node, acquiring a PoW Hash value by means of the PoW mechanism;
  based on the combination of the resource capacity rating and the PoW Hash value of a node, determining the serial number of the shard in which the node is located;
  discovering members of the shards and establishing the shards; and
  after a certain period of time, reconstructing the shards.

After the shards are constructed, the system can process transactions. Transactions submitted by a user are routed to corresponding shards according to the transaction dividing rules. The shards can then parallelly process these transactions. Reconstructing the shards comprises determining the random number and other information required for the next round, and in the next round, re-sharding all nodes to start a new round of the consensus process.

It should be noted that the above-mentioned specific embodiments are exemplary, and those skilled in the art can come up with various solutions inspired by the disclosure of the present invention, and those solutions also fall within the disclosure scope as well as the protection scope of the present invention. It should be understood by those skilled in the art that the description of the present invention and the accompanying drawings are illustrative rather than limiting to the claims. The protection scope of the present invention is defined by the claims and their equivalents. The description of the present invention contains a number of inventive concepts, such as "preferably", "according to a preferred mode" or "optionally" all indicate that the corresponding paragraph discloses an independent idea, and the applicant reserves the right to file a divisional application based on each of the inventive concepts.

What is claimed is:

1. A graphic-blockchain-orientated sharding storage apparatus, comprising
  a first sharding module and a second sharding module,
  wherein the first sharding module divides nodes having different resource capacity levels into shards based on ledger data organized using a directed acyclic graph (DAG) structure, and the second sharding module assigns a set of transactions, so that each respective transaction of said set of transactions is processed and stored in a shard matched with an execution difficulty level of the respective transaction, wherein the first sharding module rates the different resource capacity levels of the nodes to get rating results, and each of the nodes solves a Hash puzzle through a Proof of Work (PoW) mechanism so as to obtain a PoW result, wherein each node in a shared shard has an equal resource capacity rating, wherein each respective shard of the shards has a processing capacity matching a working difficulty for processing transactions of the respective shard, and the transactions of the respective shard execute using the processing capacity of the respective shard, wherein each respective node of the nodes broadcasts a rating result and a PoW result of the respective node, so as to discover members and establish the shards, wherein each respective shard of the shards only stores a part of a DAG ledger, and each node of the respective shard only stores a copy of the part of the DAG ledger, wherein a transaction newly added to the DAG ledger is only broadcasted to a shard matched with an execution difficulty level of the newly added transaction and is stored by each node in the shard matched with the execution difficulty level of the newly added transaction, wherein the graphic-blockchain-orientated sharding storage apparatus is configured to reconstruct the shards, so that all of the nodes are re-sharded, in order to start a new round of a consensus process, wherein the graphic-blockchain-orientated sharding storage apparatus is configured such that each transaction, when added into the DAG ledger, has to randomly select two Tip transactions for validation, wherein each respective Tip transaction of the two Tip transactions is a transaction that is at a tail of the ledger data and has not been validated, and that in the DAG ledger, for each respective Tip transaction, an accumulated confirmation value of the respective Tip transaction is used to represent a number of transactions that directly or indirectly validated the respective Tip transaction, and when the accumulated confirmation value reaches a preset threshold, determining that the respective Tip transaction is in a confirmed state.

2. A graphic-blockchain-orientated sharding storage method, comprising:

dividing nodes having different resource capacity levels into shards on basis of ledger data organized using a directed acyclic graph (DAG) structure; and assigning a set of transactions, so that each respective transaction of said set of transactions is processed and stored in a shard matched with an execution difficulty level of the respective transaction, wherein the step of dividing nodes having different resource capacity levels into shards comprises:

rating the different resource capacity levels of the nodes to get rating results; and having each of the nodes solve a Hash puzzle through a Proof of Work (PoW) mechanism so as to obtain a PoW result, wherein each node in a shared shard has an equal resource capacity rating, wherein each respective shard of the shards has a processing capacity matching a working difficulty for processing transactions of the respective shard, and the transactions of the respective shard execute using the processing capacity of the respective shard, wherein each respective shard of the shards only stores a part of a DAG ledger, and each node of the respective shard only stores a copy of the part of the DAG ledger, wherein a transaction newly added to the DAG ledger is only broadcasted to a shard matched with an execution difficulty level of the newly added transaction and is stored by each node in the shard matched with the execution difficulty level of the newly added transaction, wherein each transaction, when added into the DAG ledger, has to randomly select two Tip transactions for validation, wherein each respective Tip transaction of the two Tip transactions is a transaction that is at a tail of the ledger data and has not been validated, and wherein in the DAG ledger, for each respective Tip transaction, an accumulated confirmation value of the respective Tip transaction is used to represent a number of transactions that directly or indirectly validated the respective Tip transaction, and when the accumulated confirmation value reaches a preset threshold, determining that the respective Tip transaction is in a confirmed state.

3. The graphic-blockchain-orientated sharding storage method of claim 2, further comprising: reconstructing the shards, so that all of the nodes are re-sharded, in order to start a new round of a consensus process.

4. A graphic-blockchain-orientated sharding storage system, which comprises a computer device, wherein the computer device is programmed or configured to execute the steps of the graphic-blockchain-orientated sharding storage method of claim 2.

5. A graphic-blockchain-orientated sharding storage system, which comprises a computer device, wherein the computer device has its storage medium storing a computer program that is programmed or configured to execute the graphic-blockchain-orientated sharding storage method of claim 2.

6. A graphic-blockchain-orientated sharding storage system, which comprises a computer device, wherein the computer device comprises computer readable storage medium, the computer readable storage medium stores therein a computer program that is programmed or configured to execute the graphic-blockchain-orientated sharding storage method of claim 2.

7. An electronic device for storing data, which comprises: a storage device and a processor, the processor and the storage device communicate with each other through a bus, the storage device stores therein program instructions that can be executed by the processor, the processor calls the program instructions to execute the graphic-blockchain-orientated sharding storage method of claim 2.

* * * * *